UNITED STATES PATENT OFFICE.

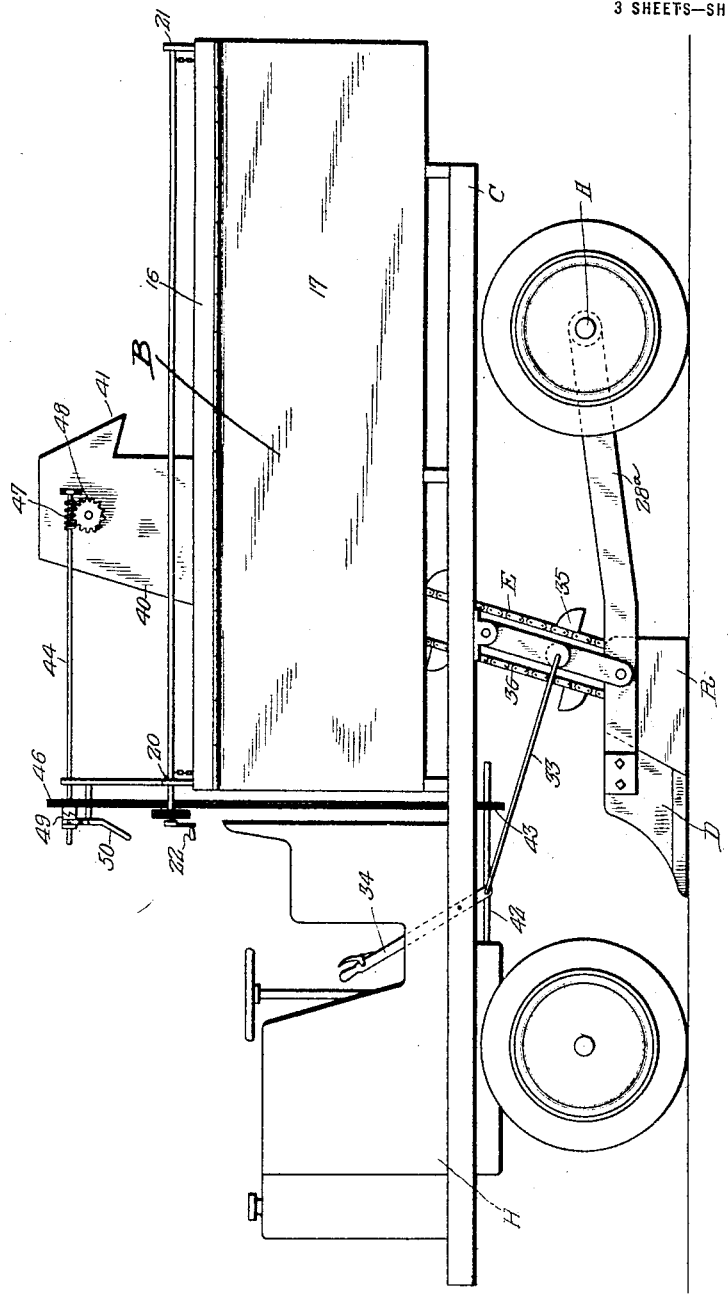

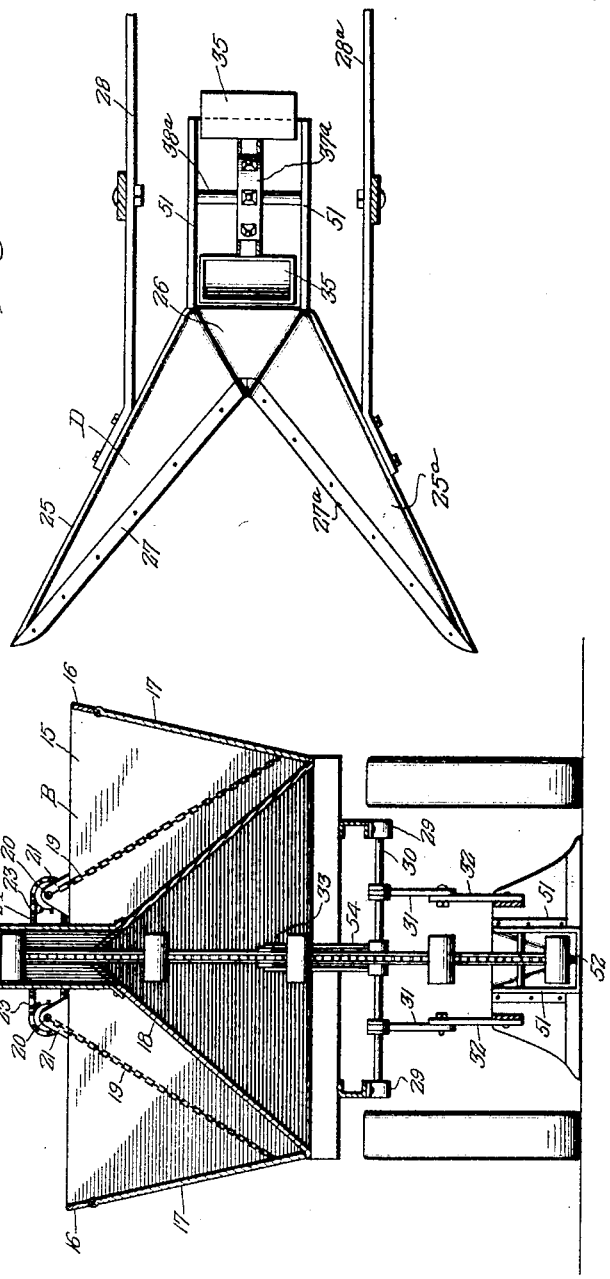

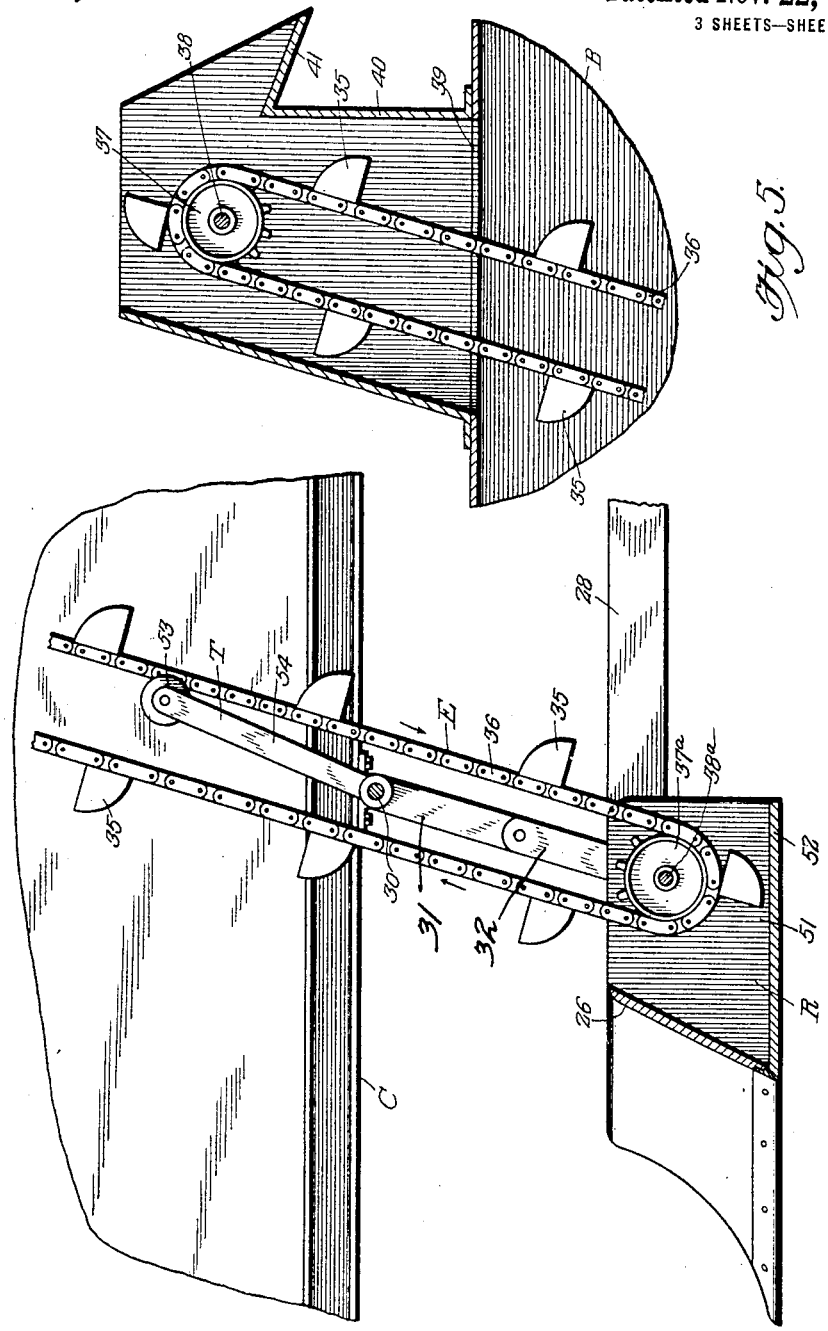

JAMES BOBBIT VON CANON, OF WEST END, NORTH CAROLINA.

SELF-LOADING VEHICLE.

1,397,993.

Specification of Letters Patent.

Patented Nov. 22, 1921.

Application filed March 12, 1920. Serial No. 365,285.

*To all whom it may concern:*

Be it known that I, JAMES BOBBIT VON CANON, a citizen of the United States, and a resident of West End, in the county of Moore and State of North Carolina, have invented certain new and useful Improvements in Self-Loading Vehicles, of which the following is a specification.

My invention relates to self-loading vehicles, and a purpose of my invention is the provision of a loading vehicle of simple and compact construction which is in the form of an attachment whereby it is rendered applicable to motor trucks of the standard construction for effecting a loading of the truck as it moves over the material to be introduced into the vehicle. My invention is particularly designed, although not necessarily, to the loading of motor trucks with road making materials such as gravel, sand, and the like.

I will describe one form of motor vehicle and one form of loading apparatus embodying my invention and will then point out the novel features thereof in claims.

In the accompanying drawings:

Figure 1 is a view showing in side elevation one form of motor truck and one form of loading apparatus embodying my invention.

Fig. 2 is a transverse sectional view taken substantially on the line 2—2 of Fig. 1.

Fig. 3 is a transverse sectional view taken on the line 3—3 of Fig. 2.

Fig. 4 is an enlarged vertical sectional view taken on the line 4—4 of Fig. 2.

Fig. 5 is a fragmentary view showing in vertical section the elevator casing and the manner in which the elevating means is mounted therein.

Similar reference characters refer to similar parts in each of the several views.

Referring specifically to the drawings and particularly to Figs. 1 and 2, I have here shown a standard form of motor truck exclusive of the body in which C designates the chassis, H the engine hood, and A the rear axle.

The loading apparatus which forms the subject matter of my invention comprises a body designated generally at B which is rigidly secured to the chassis C in any suitable manner so as to occupy the same position as the ordinary body of a motor truck. As illustrated to advantage in Fig. 2, the body B comprises end walls 15 connected at their upper ends by side walls 16. The side walls 16 are provided with relatively large openings which are normally closed by hinged doors 17. Disposed between the side walls 16 connecting the inner walls 15 are oppositely inclined partitions 18. The arrangement of the partitions 18 is such as to divide the vehicle body into two separate and independent compartments, and because of the inclination of the doors 17 when in their closed position, each compartment has downwardly inclined side walls so as to allow of the gravitation of the material from the compartments when the doors are released.

The doors 17 are secured in closed position by means of chains 19 which are connected at their lower ends to the doors 17 at points adjacent the lower edges of the latter, their upper ends being trained around a pair of shafts 20 journaled in bearing plates 21 and extending the entire length of the vehicle body as clearly shown in Fig. 1. The shafts 20 are simultaneously actuated to effect a winding or unwinding of the chains 19 by a crank 22 fixed to one end of one shaft and operatively connected to the other shaft by sprockets 23 and an endless chain 24.

The material to be loaded into the body B is collected by a concentrating device designated generally at D. As shown in Figs. 1 and 2, the concentrating device D is disposed below the body B and beneath the chassis C so that during the movement of the motor truck, the device will effect a concentration of the material to be loaded at the lower end of an elevating device designated generally at E. The elevating device in turn elevates the material to a point above the body B where it is ultimately dumped into the body.

As illustrated to advantage in Figs. 3 and 4, the concentrating device D comprises a pair of integrally formed divergent wings 25 and 25$^a$ connected at their meeting ends by a deflecting partition 26. The wings 25 and 25$^a$ are inclined rearwardly with respect to the motor truck and are tapered in width from one end to the other so as to effect a movement of the material to be loaded to a point directly in front of the partition 26 as will be hereinafter described.

The inner lower edges of the wings 25 are protected against the detrimental action of the ground and material to be loaded by metallic strips 27 and 27$^a$ respectively which are detachably secured thereto so that when they become worn or broken, new strips may be readily substituted. The concentrating device D is supported beneath the motor truck so as to be lowered into contact with the ground or elevated out of contact with the ground. To this end I provide a pair of arms 28 and 28ª secured at their forward ends to the wings 25 and 25ª, and pivotally supported at their rear ends upon the axle A. Extending transversely of the chassis C and rotatably supported thereon by means of bearings 29 is a shaft 30 to which is secured a pair of links 31, and pivotally mounted upon the lower ends of the latter are a second pair of links 32 which are in turn pivotally connected to the arms 28 and 28ª. Referring now to Fig. 1, it will be seen that a rod 33 is connected to one pair of links 31 and 32 at the point at which they are pivotally connected. The rod 33 in turn is connected to an actuating lever 34 which is disposed in convenient operating position by the driver of the motor truck. By this arrangement it will be seen that in the normal or active position of the concentrating device D, the links 31 and 32 are extended so that they are disposed in alinement with each other. However, when it is desired to elevate the concentrating device so that it will disengage the ground or the material to be loaded, the lever 34 is moved rearwardly from the position shown in Fig. 1, thereby causing a forward movement of the rod 33 which in turn imparts a forward and upward movement to the meeting ends of the links 31 and 32. As the links 31 are fixed to the shaft 30 it is obvious that such links swing upwardly about the shank as a center. This causes an elevation of the links 32 which in turn swings the arms 28 upwardly about the axle A as a center. With the arms 28 elevated it is obvious that the concentrating device occupies a corresponding position, and by providing conventional means (not shown) for locking the lever 34 in its rear extreme position, the concentrating device can be maintained in the elevated position.

The device E for elevating the material to be loaded from the concentrating device and into the body B comprises a series of scoops 35 arranged at regular spaced intervals along an endless chain 36. The endless chain 36 is trained about sprockets 37 and 37ª fixed to shafts 38 and 38ª respectively. As shown in Figs. 2 and 5, the elevator is mounted for movement through an opening 39 formed in the body B at the upper ends of the partitions 18. The portion of the elevator disposed above these partitions is inclosed by a casing 40 having a delivery spout 41 formed at its rear side and through which the material to be loaded is directed into the compartments of the body B.

As shown in Figs. 2 and 5, the shaft 38 is journaled in the casing 40, such shaft constituting the driving shaft of the elevating device and being driven by the engine of the motor vehicle through the following mechanism:

As shown in Fig. 1, the shaft of the engine is extended rearwardly as indicated at 42 and is provided with a sprocket 43 which is operatively connected to a shaft 44 by means of a chain 45 and a sprocket 46. The shaft 44 is operatively connected to the shaft 38 by a worm 47 and a gear 48. The sprocket 46 is normally disconnected from the shaft 44 but is adapted to be operatively connected thereto by a conventional form of clutch 49 operated manually through the medium of a lever 50.

From this arrangement it will be clear that when the clutch 49 occupies the position wherein it operatively connects the sprocket 46 to the shaft 44, a driving of the shaft 38 is effected to cause an actuation of the elevating device.

As shown in Figs. 3 and 4, the shaft 38ª is journaled in the side walls of a hopper R which is secured to and disposed directly in the rear of the deflecting partition 26. The hopper R comprises side members 51 having flanges formed at their forward ends which are bolted to the wings 25 and 25ª. The members 51 are connected at the lower edges by a body member 52 which is preferably formed integral with the side members as shown in Fig. 2.

In order to prevent rattling of the chain 36 when the concentrating device D is in the elevated position, I provide a tensioning device T which as shown in Figs. 2 and 4 comprise a roller 53 supported on a pair of arms 54 fixed to the shaft 30. In the normal position of the tensioning device as shown in Fig. 4, the roller 53 contacts with the inner side of the rear stretch of the chain 36. However, when the shaft 30 is rotated during the movement of the concentrating device to the elevating position, the arms 54 are moved rearwardly forcing the roller 53 against the chain 36 and thereby consuming the slack of the chain and thus maintaining the same taut.

In the operation of the loading apparatus, the motor truck travels over the material to be loaded, and during this movement the concentrating device moves through the material in such manner as to cause the latter to concentrate in front of the partition 26. After sufficient concentration of the material has been secured, the contained movement of the motor truck causes the material to be projected upwardly of the partition 26 and into the hopper R. With the elevating device moving in the direction of the arrows as indicated in Fig. 4, the scoops 35 will be moved through the material and the hopper R and in so doing become filled. As the filled scoops reach the upper end of the elevating device, they are dumped so that the material drops upon the chute 41 and ultimately into the compartments of the body B.

From this operation it will be seen that as long as the hopper R contains any of the material to be loaded, the elevating device will convey the material to the body B. After the compartments of the body B are completely filled the concentrating device is lifted to its elevated position by the actuation of the lever 34 so that the motor truck can now convey the material to the point at which it is to be used. The body B can be readily emptied of its contents by loosening the chains 19 thus allowing the doors 17 to gravitate to a vertical position. As will be understood because of the inclination of the partitions 18 the material will move downwardly of the body thus forcing the doors outwardly and thereby causing the material to fall to the opposite sides of the truck.

From the foregoing description taken in conjunction with the accompanying drawings, it will be manifest that I have provided a loading apparatus of simple and efficient construction which is readily applicable to a motor truck of the ordinary construction, and that such loading apparatus effects the self-loading of the vehicle and eliminates the necessity of employing a number of men for loading the vehicle, as it will be understood that the entire apparatus can be operated by the driver of the truck.

Although I have herein shown and described only one form of loading apparatus embodying my invention, it is to be understood that various changes and modifications may be made herein without departing from the spirit of the invention and the spirit and scope of the appended claims.

What I claim is:

1. A loading apparatus for motor vehicles comprising, a body, a delivery chute supported on the body, a concentrating device comprising divergently arranged wings supported beneath the body and adapted to collect the material to be loaded, a hopper arranged at the meeting ends of said wings for receiving the material collected by the concentrating device, and elevating means for lifting the material from the hopper and introducing it into said delivery chute.

2. A loading apparatus for motor vehicles comprising, a body, a delivery chute supported on the body, a hopper beneath the body, a concentrating device in advance of the hopper comprising wings converging in the direction of the hopper for collecting the material to be loaded and for depositing the same into said hopper, elevating means for lifting the material from the hopper and depositing the same into the delivery chute, and means for elevating said concentrating device, said hopper, and said elevating means.

3. A loading apparatus for motor vehicles comprising, a body, a delivery chute supported on the body, a hopper beneath the body, a concentrating device in advance of the hopper for collecting the material to be loaded and for depositing the same into said hopper, elevating means for lifting the material from the hopper and depositing the same into the delivery chute, means for elevating said concentrating device, said hopper, and said elevating means, and a tensioning device operable when the material elevating means is elevated to prevent rattling of the elevating means.

4. A loading apparatus for vehicles comprising a body including oppositely inclined partitions arranged on the longitudinal axis of the body, openings formed in the side of the body, and doors controlling said openings, a delivery chute supported on the body, a hopper supported below the body, a concentrating device in advance of the hopper, and means for elevating the material from said hopper into said delivery chute.

5. A loading apparatus for vehicles comprising, a body having dumping openings formed in the sides thereof, partitions within the body arranged to cause material to gravitate from the body through said openings, doors for controlling said openings hingedly supported to normally occupy an open position, means for securing the doors in closed position, a delivery chute supported upon the body, a hopper disposed below the body, a concentrating device in advance of the hopper, and means for elevating the material from the hopper and introducing the same into said delivery chute.

6. In a loading apparatus for vehicles, a concentrating device comprising divergently arranged wings, a hopper formed at the rear of said wings, and a deflecting partition connecting said wings and interposed between the same and said hopper for the purpose described.

7. A loading apparatus for vehicles comprising, a body, a delivery chute supported on the body, a concentrating device, a hopper in the rear of the concentrating device, arms rigidly secured to the hopper and device for pivotally supporting the same on a vehicle, a shaft, links fixed to said shaft, links pivoted on said arms and pivotally connected to the first links, a rod connected to said links for actuating the same to effect the lowering or elevating of said arms, and elevating means for conveying the material from said hopper to said delivery chute.

8. A loading apparatus for vehicles comprising, a body, a delivery chute supported on the body, a concentrating device, a hopper in the rear of the concentrating device, arms rigidly secured to the hopper and device for pivotally supporting the same on a vehicle, a shaft, links fixed to said shaft, links pivoted on said arms and pivotally connected to the first links, a rod connected to said links for actuating the same to effect the lowering or elevating of said arms, an endless chain rotatably supported adjacent said hopper and said delivery chute, scoops carried by said chain, and means for actuating said chain to cause said scoops to convey the material from said hopper and to deliver the same into said delivery chute.

9. A loading apparatus for vehicles comprising, a body having dumping openings in the sides thereof, partitions within the body inclined toward said openings, doors controlling said openings and hingedly supported to normally ocupy open positions, means for securing the doors in closed position, a casing supported on the inclined partitions and extending above said body, a delivery chute formed on the casing, a concentrating device supported below the body, a hopper in the rear of the concentrating device, a driving shaft journaled in the hopper, a driving shaft journaled in the casing, sprockets fixed to said shafts, an endless chain trained about said sprockets, scoops carried by said chain, and means for elevating and lowering said hopper and said concentrating device.

10. In combination, a motor vehicle, a body supported on the chassis of said vehicle, dumping means for the body, a delivery chute supported on the body and communicating with the lower side thereof, a concentrating device arranged below the chassis and normally contacting with the ground to effect a collecting of the material to be loaded under the action of the moving vehicle, a hopper arranged to receive the material as it is collected, means for pivotally supporting said device and said hopper on the rear axle of the vehicle, means for elevating the material deposited in said hopper to said delivery chute, and means for lowering or elevating said hopper and said concentrating device.

11. In combination, a vehicle, a concentrating device supported below the vehicle and normally contacting with the ground, said concentrating device being of V-shaped formation to effect the collecting and concentrating of a material to be loaded at the apex thereof, a hopper for receiving the material as it is collected, and means for elevating the material from said hopper into the body of the vehicle.

JAMES BOBBIT VON CANON.